July 30, 1968 W. L. LINDLEY 3,394,749
SAFETY INSERTS FOR TUBELESS TIRES
Filed March 18, 1966 3 Sheets-Sheet 1

William L. Lindley
INVENTOR.

BY Hayden & Pravel
ATTORNEYS

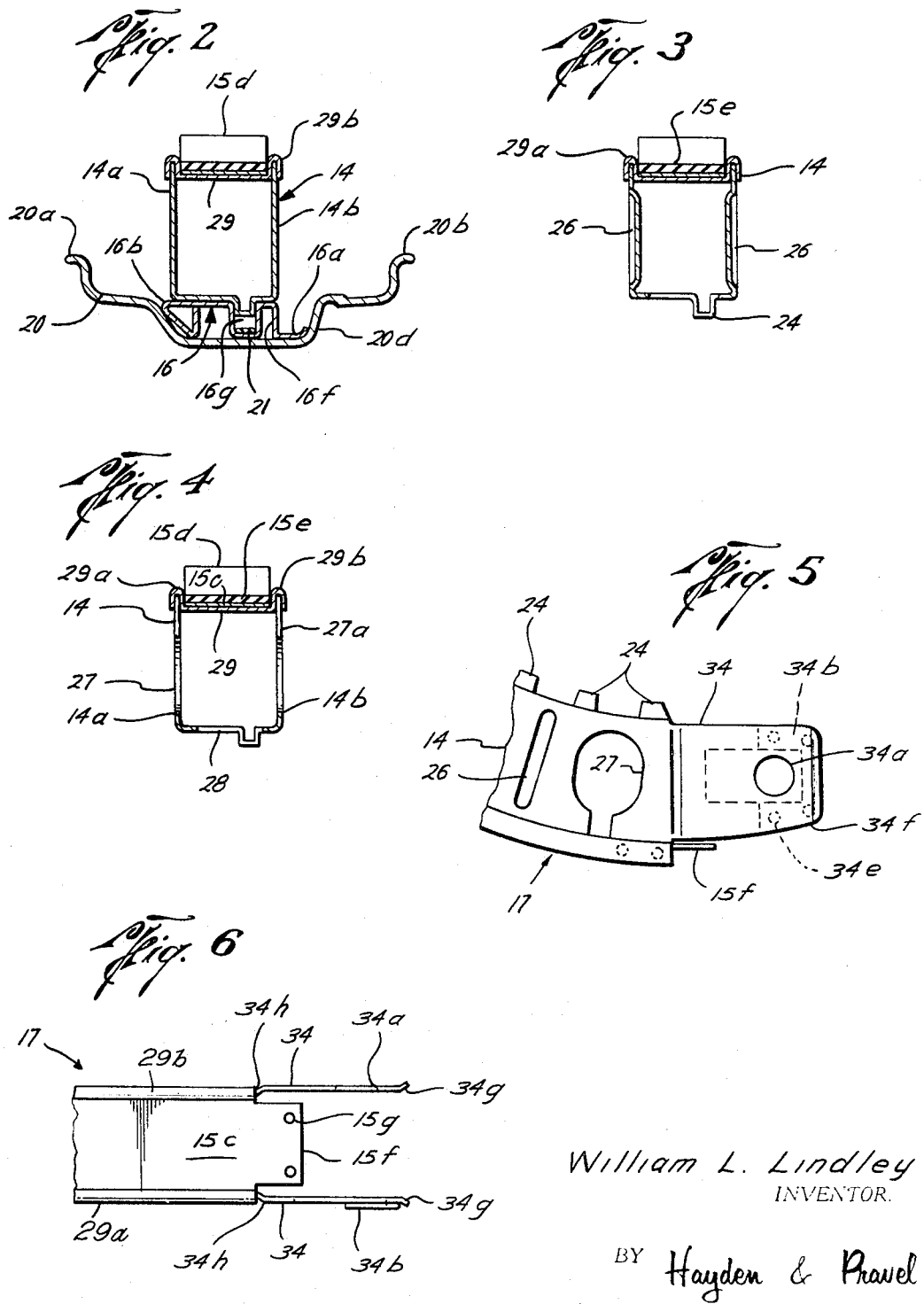

July 30, 1968    W. L. LINDLEY    3,394,749
SAFETY INSERTS FOR TUBELESS TIRES
Filed March 18, 1966    3 Sheets-Sheet 3
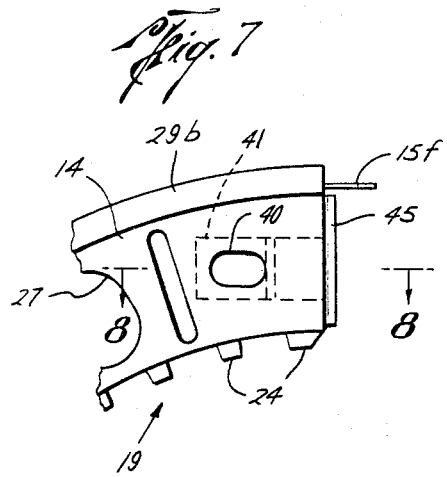
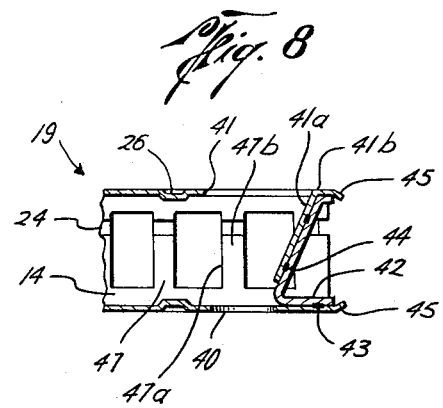
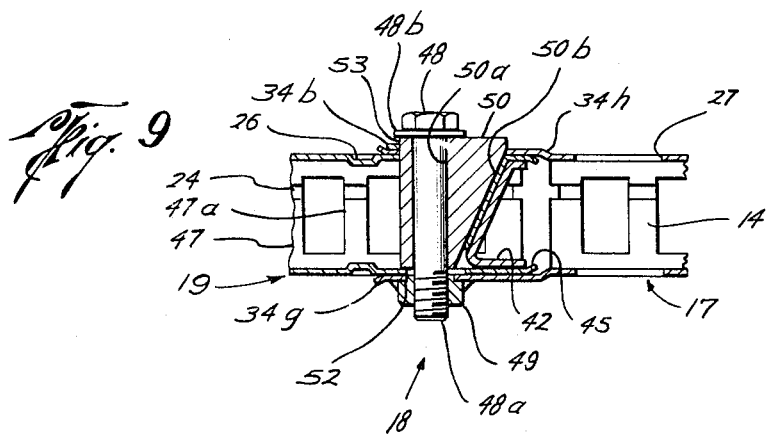
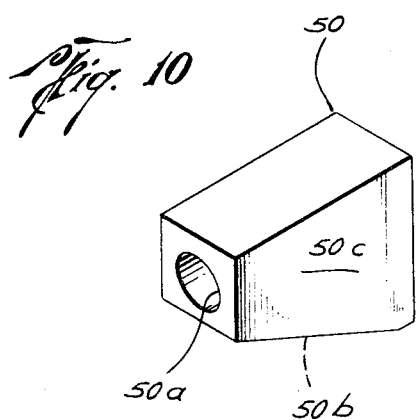
William L. Lindley
INVENTOR.
BY Hayden & Pravel
ATTORNEYS

3,394,749
SAFETY INSERTS FOR TUBELESS TIRES
William L. Lindley, Houston, Tex., assignor, by mesne assignments, to William W. Carstens, San Diego, Calif.
Filed Mar. 18, 1966, Ser. No. 535,540
9 Claims. (Cl. 152—158)

ABSTRACT OF THE DISCLOSURE

A safety insert for a tubeless tire formed from a plurality of channel shaped arcuate segments attached one to the other to form a ring having a resilient member on its outer periphery which supports the inner surface of a tubeless tire on deflation. The ring is mounted on an adapter seated in the drop center of the rim.

---

This invention constitutes improvements over the structure shown in U.S. Patent No. 3,237,667, issued Mar. 1, 1966.

One object of the present invention is to provide a new and improved safety insert for a tubeless tire using a drop-center tire rim wherein adapter means contoured for accurate, safe, and precise seating of the safety insert adjacent the rim are provided.

Another object of the present invention is to provide a new and improved safety insert construction whereby resilient material supporting the weight of the vehicle is controllably confined on yielding to the weight of the car to continuously feed the bunched-up tire carcass past the point of contact with the roadway on rotation of the tire.

A related object of the present invention is to provide a new and improved safety insert wherein the resilient material includes radially-extending serrations separated by recesses which are flanked by flanges extending adjacently thereto for controlling the flow of the resilient member.

Other objects and advantages of the present invention will become more readily apparent from an examination of the drawings wherein:

FIG. 2 is a sectional view taken along the line 2—2 of FIG. 1 illustrating the relationship of the encircling, load bearing structure of the safety insert, adapter means, and the drop-center rim;

FIG. 3 is a sectional view taken along the line 3—3 of FIG. 1 illustrating additional detail of the encircling, load bearing structure;

FIG. 4 is a sectional view taken along the line 4—4 of FIG. 1 which provides further detail of the load bearing structure;

FIG. 5 is a plan view of the coacting means carried at one end of the segments for connection of said segments to form an encircling structure;

FIG. 6 is an orthogonal view of the structure shown in FIG. 5 illustrating additional detail thereof;

FIG. 7 is a plan view of the coacting means carried at the other end of segments of the load bearing structure for co-operation with the means shown in FIG. 5;

FIG. 8 is a sectional view taken along the line 8—8 of FIG. 7 illustrating internal construction of the coacting means shown therein;

FIG. 9 is a sectional view taken along the line 9—9 of FIG. 1 illustrating co-operation of the means shown in FIGS. 5 and 7 when joined together for forming an encircling load bearing structure; and FIG. 10 is an isometric view of means utilized in the coacting means of the present invention.

Figure 1:
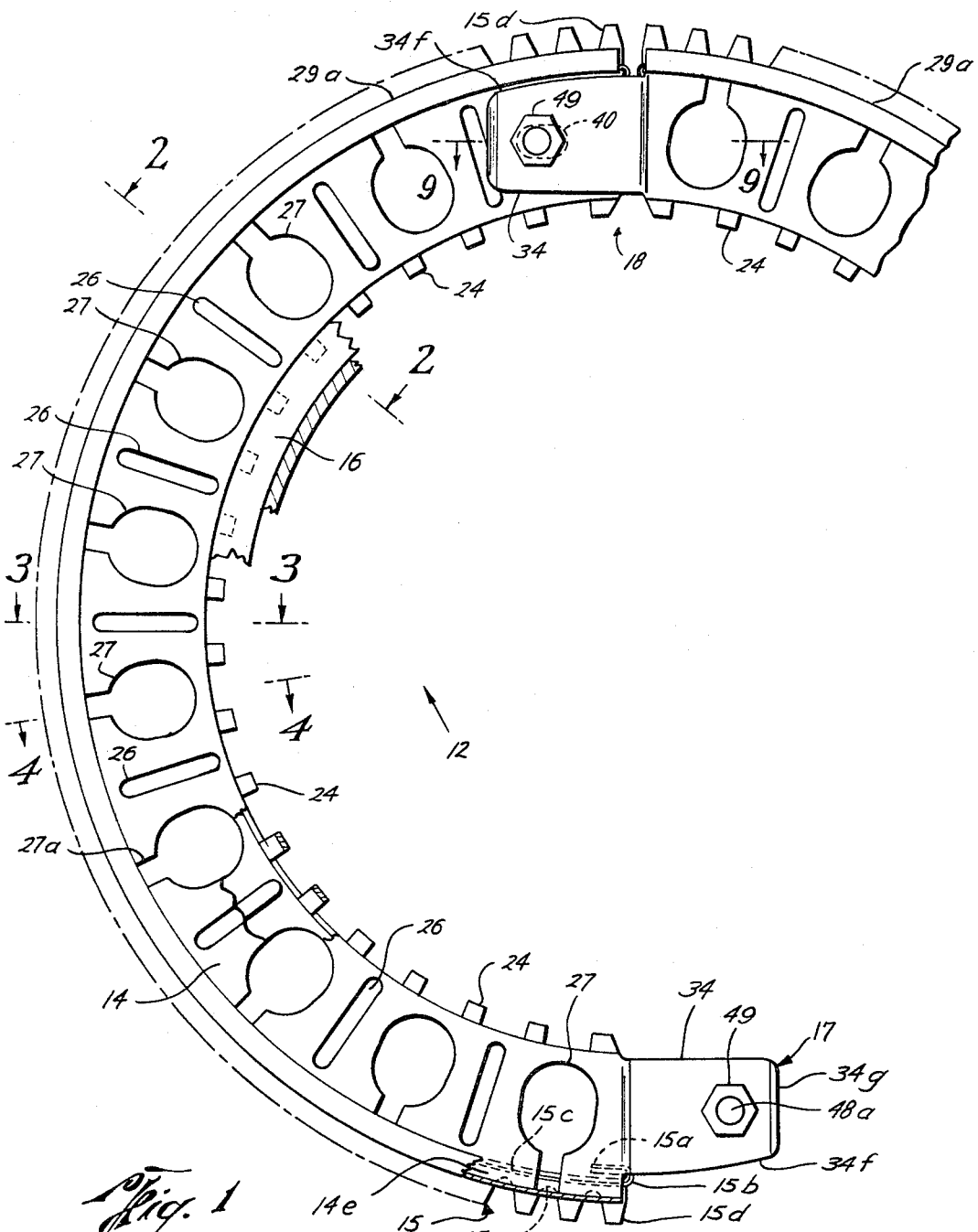
FIG. 1 is a side view of one of two identical semicircular arcuate portions forming the load bearing structure of the present invention.

In the drawings, the numeral 12 indicates generally one segment of the safety insert of this invention which includes a load bearing structure 14 positioned for co-operation with and adjacent to an adapter means 16. A yieldable, serrated member 15 is positioned exteriorly of the member 14 and is adapted to contact and support the inner surface of the tread portion on a tubeless tire on deflation. The preferred embodiment of the present invention includes two semicircular segments 12 which are secured together about the wheel of the vehicle by interconnection of the connecting means indicated generally at 18 in FIG. 1. Each of the identical segments 12 of the preferred embodiment includes coacting means 17 and 19 (illustrated in detail in FIGS. 5 and 7 respectively) at its ends which are interconnected to form an encircling, load bearing structure supporting the weight of the vehicle. When the tire is deflated, the resilient means 15 supports the vehicle for continued operation of the vehicle on a partially inflated tire without fear of damage to the tire. The adapter means 16 of the present invention is particularly structured in accordance with the cross-sectional design of the various and sundry drop-center rims to accommodate the many models manufactured for vehicles available to the consuming public as will be noted in greater detail hereinafter.

Considering the invention in greater detail, attention will be next directed to the number of sectional views which will be described, and the description of the sectional views will be correlated on reference to FIG. 1. In this manner, it is believed that the invention may be best understood and the details thereof will be properly related to the various drawings. Therefore, attention is first directed to FIG. 2.

In FIG. 2, the numeral 20 indicates the drop-center tire rim which includes a pair of projecting edges 20a and 20b. The rim 20 includes a depressed central portion 20d but it should be noted that the shape of the rim as shown by the cross section of FIG. 2 is subject to variation depending on the manufacturer of the rim. At any event, whatever the shape of the drop-center rim, the present invention includes the structure 14 shown in FIG. 2 which co-operates with the adapter means indicated generally at 16. The adapter means 16 is preferably formed with the contour of the drop-center rim in mind to the extent that the adapter means 16 includes the arcuate edge portion 16a abutted at an edge of the width of the depressed central portion 20d to laterally fix the adapter means 16 against the movement in that direction. On the other side, the adapter means includes the angularly-extending face carried on the structure at 16b preventing or fixing lateral movement in that direction. Therebetween, the means 16 includes radially outwardly-extending ribs which are load bearing members. The sectional view of FIG. 2 illustrates the radially-extending ribs 16f which lends support to the load bearing structure 14 since all loads thereon are transmitted to the rim through the means 16. Thus, in FIG. 2, the adapter means 16 includes four supporting ribs and the angled face 16b to provide adequate support.

The adapter means 16 preferably is formed in a plurality of segments for ease of assembly and positioning about the tire rim 20. The device uses any number of segments (two or more) which are formed to contact the rim 20 in the above-noted manner. Ease of assembly results from placing an elastic member 21 fully about the segments on the rim 20 so that the elasticity of the member 21 tends to pull the segments together in a circle. Thus, a temporary restraint of the segments prior to full assembly of the device is obtained when the elastic member is positioned as shown in FIG. 2.

The elastic member 21 is received within a channel 16g formed in the adapter means 16 extending fully thereabout for purposes of receiving the elastic member. In addition, the channel 16g is used for alignment purposes of the structural support member 14 as will be described in greater detail hereinafter.

Going now to FIG. 3, it should be noted that the adapter means 16 has been omitted therefrom for purposes of clarity to permit an unimpeded view of the alignment means 24 formed at the lower side of the load bearing structure 14. The alignment member is in the form of a registered, rectangular protrusion or tab which is a continuous member with the material of the support member 14. The alignment member 24 is preferably rectangular in shape and extends therefrom a predetermined distance. In addition, the location of the alignment member is registered with respect to one of the edges of the structure 14 to fit the load bearing structure 14 on the adapter means 16.

Referring again to FIG. 1 of the drawings, it will be noted therein that the alignment members 24 are spaced preferably regularly about the inner perimeter of the segments 12 and extend therefrom to position the entirety of the segment 12 with respect to the adapter means 16.

The structure shown in FIG. 3 illustrates a portion of the side wall of the structure 14 which is indented at 26 for purposes of reinforcing. The indentations 26 form a stiffening member in the side wall at spaced locations as they are shown in FIG. 1. Such indentations are provided on both sides of the load bearing structure 14 as shown in FIG. 3.

The section shown in FIG. 4 differs from the section in FIG. 3 because the section line passes through openings 27 in the side walls as also shown in FIG. 1. It should be noted that the holes 27 are somewhat oval in shape and include an extension at 27a running to the outer periphery of the load bearing structure 14.

The section lines in FIG. 4 indicate that the base portion of the load bearing structure 14 is reduced in weight and mass by the inclusion of lightening holes 28 which reduce the mass of the structure somewhat. Of course, the structure is maintained sufficiently strong to fully support the weight of the automobile on the failure of the tubeless tire.

The outer surface of the load bearing structure 14 is formed by a continuous member 29 which is coterminous with each load bearing structural segment 12 and which is joined thereto by suitable means such as a spot weld or the like. The illustration shows the member 29 as extending between the side walls 14a and 14b, and it is constructed and arranged to provide a recessed area as will be described. The member 29 is lapped against the side walls 14a and 14b at the outer edges of the side walls as shown in FIGS. 2–4 and extends over the edges at 29a and 29b. The recessed area adjacent the planar portion of the member 29 provides a pair of radially, outwardly-extending flanges which assist operation of resilient means to be discussed.

Attention is redirected to FIG. 1 which illustrates the resilient means 15 which preferably extend fully about the segment 12. The resilient member 15 extends along the circumference of the load bearing structure 14 and is adapted to contact and support the tread portion of the tubeless tire on loss of air pressure. The resilient means 15 extends the full length of the segment 12 shown in FIG. 1 and includes a tab 15a which is bent at 15b to extend interiorly of the load bearing structure 14 and is fastened to the inside face of the plate member 29. The flexible metal strip 15c is adjacent to the member 29 and extends fully thereabout for positioning the resilient material comprising the member 15 as will be noted in greater detail hereinafter. The resilient material is preferably bonded or vulcanized thereto as one means of attachment. The metal strip 15c is preferably bradded or riveted to the load bearing structure 14 at suitable locations, and it will be appreciated that the utilization of removable rivets makes the member removable and replaceable.

Attention is directed to FIGS. 2–4 which illustrate additional details of the resilient member 15. The member includes a plurality of radially, outwardly extending serrations 15d, or segments, separated by recessed portions 15e. As best seen in FIG. 1, the protruding serrations 15d extend well beyond the load bearing structure while the recessed portions of the resilient member indicated at 15e are located interiorly of the side wall 14a of the load bearing structure 14. Attention is directed to the side wall portion 14e shown in FIG. 1 wherein the above-noted radial spacing is illustrated and it will be further noted that the lapped edge portions of the plate member 29 also definitively co-operate with the side walls of the load bearing structure 14 to further constrain the resilient means 15.

It will be appreciated that the weight of a vehicle acting on a partially deflated tire is substantial and can possibly do harm to the carcass of the tire should the carcass be pinched or otherwise abraded between the rim and the pavement therebelow. Thus, the present invention provides a structure which prevents deformation of the tire carcass on full deflation to avoid such damage. But, in addition, the possibility of damage to the tire carcass exists in driving with partially deflated tires wherein the instantaneous velocity of the tire body is greater than the velocity of the various points of the tire rim due to the fact that the radius of rotation of the tire tread is greater. Thus, in attempting to drive on a partially deflated tire, it is necessary to squeeze or bunch up circumferential-wise portions of the tire carcass which are fed through the point of contact defined by the rim and the pavement to maintain the same angular velocity for the tire and the rim. In view of this, damage possibilities are great should the tire be bunched or folded at the point of contact between the rim and pavement without the provisions of the present invention. The present invention provides a resilient means which is serrated about the exterior surface for feeding the bunched-up portions of tire carcass past the point of contact without damage. In a sense, the flexing and folding of the resilient material at the point of contact is aided by the resilient means 15 without the resulting damage being inflicted thereon. The present invention incorporates the flanges 29a and 29b which are positioned adjacent to the resilient means 15 and which extend fully thereabout to limit the wear and tear on the resilient means 15. Specifically, when the resilient means is loaded while a vehicle is driven on a partially deflated tubeless tire, the material forming the resilient means 15 flows in a yielding manner in response to the loading of the tire at the point of contact with the pavement. The flow of the resilient means is constrained or limited by the provision of the flanges 29a and 29b to limit the amount of deformation and to also limit the permanent set taken by the radially, outwardly-projecting serrations on the resilient means 15. Thus, it will be appreciated that the operation of the resilient means 15 is materially altered and extended by the utilization of the adjacent, parallel flanges which delimit and constrain the flow of the resilient material on deformation.

It was previously noted with respect to FIG. 1 that coacting means 17 and 19 are included at the end portions of the various segments 12 forming the load bearing structure of the present invention. A consideration is now directed to FIGS. 5-10 for a greater description of the coacting means 17 and 19.

A first consideration should be given to FIGS. 5 and 6 which are two views illustrating the means 17 located at the ends of the various segments 12. In FIG. 5, a projecting connector tab 34 extends from one side wall of the boxlike supporting structure 14 and includes the circular opening 34a drilled therein for reception of a shaft as will be described in greater detail hereinafter. In the view of FIG. 5, it will be noted that the back side of one of the tab members 34 is reinforced by a member 34b which member is attached thereto by suitable means such as the spot welds 34e shown in dotted line. The outer end of the tab 34 is of reduced width to enable same to be inserted about the other means 19 as will be noted hereinafter and is also curved at 34f wherein the curvature is a continuation of the curvature of the encircling load bearing structure of the present invention. In FIG. 6, it will be noted that the projecting tab 34 is duplicated on both sides of the structure with the reinforcing tab 34b being located on only one of the two tabs for reasons to be noted in greater detail hereinafter. The outer edges of the projecting tabs 34 are flared slightly outwardly at 34g to receive the means 19 and tend to funnel same between the tabs 34. The tabs 34 project in an offset manner and do not align with the walls of the structure 14 because of the slight deflection at 34h.

FIGS. 5 and 6 both illustrate the member 15c which is attached to the upper surface of the boxlike structure of the support 14 and which extends beyond the end or termination of the structure at 15f. The extension 15f provides sufficient material to be bent beneath the member 29 to form the tab 15a and it is also provided with suitable rivet holes 15g useful in attaching resilient means 15 to the safety insert of the present invention. It will be appreciated that the views illustrated in FIGS. 5 and 6 omit the resilient material attached to the flexible metal base for clarity of illustration.

Attention is directed to FIGS. 7-10 which illustrate the means 19 with the structure shown in FIGS. 5 and 6 to comprise the coacting means 18 as best shown in FIG. 1. In the drawings, FIG. 7 shows the resilient means 15 to the extent that the projecting tab 15f is extended beyond the termination of the member 29. Of course, the member 29 is lapped over as illustrated at 29b in FIG. 7 for supporting the resilient means 15. It has been previously noted that the structure 14 incorporates a pair of preferably parallel side walls wherein the side wall viewed in FIG. 7 includes an oval opening 40 for reasons to be decribed. The opposite wall of the load bearing structure 14 is provided with an essentially rectangular opening 41 which is positioned relative to the opening 40 as best shown in FIG. 7. In FIG. 8, it will be noted that the rectangular opening 41 has a greater length than the opening 40 to receive a wedge member to be described therein for purposes of joining the segments 12 of the present invention together. Further, FIG. 8 illustrates an angularly-extending reinforcing member 42 which is joined to the load bearing structure 14 by means such as the spot weld indicated at 43 as a reinforcing member for bearing the force of a wedge member inserted in the load bearing structure 14 as will be described. The reinforcing member 42 extends angularly across the load bearing structure 14 and is also spot welded at 44 to a metal tab 41a which can be, if desired, the metal removed to form the opening 41 which is left attached to the structure at 41b and which is bent to parallel the face of the reinforcing member 42 as best shown in FIG. 8. As previously illustrated in FIG. 6, the coacting means 17 includes the flared end members 34g on the projecting tabs 34 and the means 19 illustrated in FIGS. 7 and 8 include the inwardly bent tabs 45 which improve engagement of the members forming the coacting structure 18.

FIG. 8 illustrates the member which forms the inner surface of the load bearing structure 14 which is indicated by the numeral 47 and it will be noted that the weight of the member is reduced by placing the spaced, rectangular openings 47a therein fully about the load bearing structure. Also, FIG. 8 illustrates the alignment tabs 24 which are formed in the remaining metal strips 47b.

Attention is directed to FIG. 9 which shows the coacting means 17 and 19 in a locked position wherein the locked position joins the segments 12 of the load bearing structure together and draws them snugly about the adapter means 16 previously noted for securing same relative to a tire rim. In FIG. 9, the means 19 is inserted between the pair of tabs 34 (see FIG. 6) and the holes therein are aligned. Specifically, the hole 34a is positioned adjacent to the oval opening 40 (FIG. 7) and the bolt 48 is positioned therein. The bolt 48 includes the bolt shaft 48a which extends through the openings 40 and 34a in that sequence and a nut 49 or other locking member is threaddedly engaged therewith for snugly fixing the bolt 48 as will be noted hereinafter. The shaft of the bolt 48 is passed through an internal opening 50a in a wedge member 50 and a shoulder 48b on the lower side of the head of the bolt 48 is used to drive the wedge 50 interiorly of the load bearing structure generally shown in FIG. 9. The sectional view of FIG. 9 illustrates the shape of the member 50 and it will be noted that the face 50b of the wedge bears against the angularly-directed tab 41a and the structural reinforcing member 42 (see FIG. 8) therebehind wherein the angular contact resolves the transverse motion of the wedge 50 at the urging of the bolt 48 into movement along the main axis of the load bearing segments 12 which tends to draw the segments together. More specifically, when the nut 49 is tightened relative to the bolt 48 and the shoulder 48b bears against the wedge member 50, the wedge member is urged interiorly of the load bearing structure 14. Such movement of the wedge 50 shown in FIG. 9 urges the reinforcing structural member 42 towards the right of FIG. 9 which tends to draw the means 19 interiorly of the projecting tabs 34. Such movement draws the load bearing segments together. When they are drawn together, it will be appreciated that the engagement of the segments and the adapter means 16 previously described secures the safety insert of the present invention snugly about the tire rim and serves as the sole means for attaching same to the rim.

It will be appreciated that reaction forces act upon the projecting tabs 34 (see FIG. 6) at the points 52 and 53 in FIG. 9. It was also noted that the reinforcing segment 34b attached to one of the tabs 34 is placed thereon for structural reinforcing and such means bears the load of the wedge 50 as it acts against the reaction point 53. The reaction point 52 is contacted by the nut 49 placed on the bolt wherein it will be noted that the drawing illustrates the nut 49 as including a shoulder contacted against the perimeter of the circular opening 34a shown in FIG. 5 for such purposes.

It is believed that the foregoing description of the coacting means 18 is sufficient to detail the use thereof but it is further believed that the illustration of FIG. 10 which shows the wedge member 50 will enlighten understanding as to how the transverse movement of the bolt 48 is resolved into movement along the major axis of the encircling load bearing structure whereby the load bearing structural segments 12 are drawn together. In FIG. 10, the wedge member includes the axial opening 50a and the face 50b which is adapted to act against the structural reinforcing member 42 illustrated in FIGS. 8 and 9. The upper face of the wedge is represented at 50c and is trapezoidal in shape.

Returning again to the structure illustrated in FIG. 1, it will be noted that the lower portion of FIG. 1 illustrates the projecting tab 34 and shows therewith the nut 49 and the end of the shaft 48a of the bolt used for securing the present invention to a rim inside a tubeless tire. The upper portion of the drawing illustrates the coacting means 18 in an operative state and it particularly illustrates how the curvature 34f on the projecting tab co-operates with the lapped member 29a. As previously noted, tightening of the nut 49 on the bolt 48 draws the segments 12 of the present invention towards one another for securing the load bearing structure of the present invention about the tubeless tire rim.

In operation, the safety insert of the present invention may be attached to a tubeless rim in the following manner. The adapted means 16 is first positioned adjacent to the rim and the elastic member 21 is placed in the channel 16g defined in the adapter means 16 for temporarily securing the segments of the adapter means 16 relative to the rim. The elastic member, as noted above, is a fastening member only to the extent that the segments of the adapter means 16 are positioned relative to the rim adequately to free the operator to handle the segments of the load bearing structure subsequent to the installation of the adapter means 16. It will be noted that the adapter means 16 is positioned with the curled lip 16a placed against the upturned portion 20d of the tire rim 20 (see FIG. 2) and equally suitable alignment is provided at the other edge of the adapter means as also illustrated in FIG. 2. Thereafter, the segments of the load bearing structure 14 are positioned adjacent to the adapter means 16 by placing the protruding alignment tabs 24 in the channel 16g above the elastic member 21 as illustrated in FIG. 2. The installed position of the segments 12 secures same against movement relative to the rim 20 with the exception of rotation thereabout. Rotation of the load bearing structure of the present invention is prevented by the coacting means 18 which prevent relative rotation by drawing the segments 12 snugly or tightly together. As the segments are drawn together by tightening the nut and bolt of the coacting means 18, the slight relative movement of the segments 12 towards one another forces the alignment tabs 24 into the channel 16g provided in the adapter means to maintain alignment of the load bearing structure with respect to the wheel and tubeless tire and to also lock the segments in position. Engagement between the load bearing structure 14 and the adapter means 16 is sufficient to prevent movement therebetween, the engagement also prevents movement of the adapter means on the rim 20. Thus, movement is prevented when the invention is properly installed through the use of the coacting means 18.

It will be appreciated that the invention presently provided is adapted to be removed and placed on other tire rims for any number of installations. If, for instance, the owner purchases the present invention for use on a vehicle and the vehicle is used until it is sold and replaced, the invention provides a safety insert which is removed from the first vehicle and which is installed on the second vehicle. In this instance, the coacting means of the present invention is operated to remove the segments 12 and to permit the placement on the second vehicle. Moreover, the present invention provides an adapter means which universally permits operation of the present invention with a variety of rim shapes. By way of example, the various manufacturers of automobiles may vary the contour of the tire rim from that pictured in FIG. 2. The present invention provides a structure wherein the load bearing structure is adaptable for use with various shapes of tire rims by the utilization of additional adapter means 16. It will be observed that the adapter means accommodates changes or variations in the width of the drop-center portion of the rim and will also accommodate variations in the contour thereof. Also, the adapter means may be constructed and arranged to co-operate with drop-center rims which vary slightly in diameter. Accordingly, the life and the useability of the present invention is made essentially indefinite and is completely free of rather than dependent on a design which is not likely unvariant.

Briefly, the present invention relates to a tire safety insert wherein adapter means is provided for the safety insert and wherein an improved construction for the resilient means is provided.

What is claimed is:

1. An insertable and removable tire safety device adapted for use with a wheel and tubeless tire, comprising:
   (a) an encircling load bearing structure means formed of a plurality of segments for extending about a wheel rim;
   (b) a base portion on said structure means;
   (c) adapter means having an outer surface for seating said base portion of said structure means;
   (d) said adapter means also having an inner surface for seating said adapter means within the drop center of the wheel rim;
   (e) coacting means carried on the ends of said plurality of structure segments for connecting said structure segments together to form said load bearing structure; and
   (f) said coacting means including drawing means for drawing said segments snugly about said adapter means and securing said segments relative to said adapter means.

2. The invention of claim 1 including:
   (a) a shaft carried near one end of one of said structure segments;
   (b) a wedge means slidably mounted on said shaft and having a working surface angularly inclined with respect to the longitudinal axis of said shaft;
   (c) a reinforcing member defining a fixed surface means having a surface parallel to said working surface and carried on the coacting end of another of said structure segments for engagement with said working surface; and
   (d) locking means for locking said fixed surface means in position relative to said working surface.

3. The invention of claim 1 wherein said base portion carries alignment means for engaging said adapter means.

4. The invention of claim 1 wherein said adapter means is segmented.

5. The invention of claim 3 including receptacle means carried on said outer surface of said adapter means for receiving said alignment means and for securing said load bearing structure relative to the rim and tire.

6. The invention of claim 1 wherein said base portion includes projecting means registered with said adapter means, and the outer surface of said adapter means includes opening means for receiving said projecting means therein, and wherein said adapter means is segmented and including an elastic member for drawing said adapter segments about the rim for receiving said load bearing structure.

7. An insertable and removable tire safety device adapted for use with a wheel and tubeless tire, comprising:
   (a) an encircling load bearing structure formed of a pluarlity of segments sufficient to extend about a wheel rim;
   (b) coacting means carried on the ends of said structure segments for connecting same together into said load bearing structure;
   (c) said coacting means drawing said segments snugly about a wheel rim for securing same thereto;
   (d) resilient means carried by said load bearing structure around the outer periphery thereof and interiorly of the tread portion of the tire to yieldingly support the tire on deflation; and
   (e) a pair of parallel, radially-extending members carried on said load bearing structure at the edges of said resilient means for limiting the resilient flow of said resilient means.

8. The invention of claim 7 wherein said resilient means includes a plurality of radially-projecting segments separated by recesses in said resilient means, and said parallel members extend radially outward relative to at least a portion of the recesses in said resilient means but short of the radially-projecting segments.

9. The invention of claim 1 wherein said adapter means projects laterally within the rim to fix said adapter means in position against lateral movement, and said adapter means is secured against rotation relative to the rim solely by said coacting means.

References Cited
UNITED STATES PATENTS

| | | | |
|---|---|---|---|
| 2,241,858 | 5/1941 | Hruska | 152—158 |
| 2,775,282 | 12/1956 | Kennedy | 152—158 |

ARTHUR L. LA POINT, *Primary Examiner.*

Y. P. SCHAEVITZ, *Assistant Examiner.*